(12) United States Patent
Furukawa et al.

(10) Patent No.: US 8,110,940 B2
(45) Date of Patent: Feb. 7, 2012

(54) SINGLE INPUT AND DUAL-OUTPUT POWER SUPPLY WITH INTEGRAL COUPLING FEATURE

(75) Inventors: James Furukawa, Vernon Hills, IL (US); Nicholas R. Goebel, Oak Creek, WI (US); Amy L. Stachowiak, Wauwatosa, WI (US); Derrick S. Hinds, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 408 days.

(21) Appl. No.: 12/236,428

(22) Filed: Sep. 23, 2008

(65) Prior Publication Data
US 2009/0261653 A1 Oct. 22, 2009

Related U.S. Application Data

(60) Provisional application No. 61/046,231, filed on Apr. 18, 2008.

(51) Int. Cl.
*H02J 3/00* (2006.01)

(52) U.S. Cl. .......................................................... 307/17
(58) Field of Classification Search ...................... 307/17
See application file for complete search history.

(56) References Cited

U.S. PATENT DOCUMENTS

| 7,116,014 | B1 * | 10/2006 | Herbert | 307/69 |
| 2007/0029879 | A1 * | 2/2007 | Eldredge | 307/18 |
| 2007/0096562 | A1 * | 5/2007 | Bainbridge et al. | 307/35 |

\* cited by examiner

*Primary Examiner* — Rexford Barnie
*Assistant Examiner* — Dru Parries
(74) *Attorney, Agent, or Firm* — Fletcher Yoder, P.C.

(57) ABSTRACT

A control and monitoring system power supply is described that receives a single power input and distributes power to two distinct segments of a control and monitoring system network. The power supply includes a single power input configured to receive AC from a power source and at least partially convert the AC power to an operable voltage for a network device. Further, the power supply includes dual power output drivers that share power from the single power input and distribute the power to distinct network cable segments. Each of the dual power output drivers is separate and common grounded with respect to the other.

19 Claims, 4 Drawing Sheets

SINGLE INPUT AND DUAL-OUTPUT POWER SUPPLY WITH INTEGRAL COUPLING FEATURE

CROSS REFERENCE TO RELATED APPLICATIONS

This application is a Nonprovisional Patent Application of Provisional Patent Application No. 61/046,231, entitled "Single-Input and Dual-Output Power Supply with Integral Coupling Feature", filed Apr. 18, 2008, which is herein incorporated by reference.

BACKGROUND

The present invention relates generally to control and monitoring networks, such as those used in industrial applications. More particularly, the invention is directed to techniques associated with powering and facilitating communication between multiple networked devices in a control and monitoring system.

A control and monitoring system may include a device or set of devices that monitor and/or manage the behavior of other devices of a system. Indeed, a control and monitoring system may essentially act as a nerve center for a system. For example, in many industrial and commercial applications, a device, such as a programmable controller or computer, may send and receive signals over a network to operate and/or monitor a wide range of motors, valves, actuators, sensors, and the like. It should be noted that a control system may include one or more individual controllers, computers, and so forth, in a single location or remote locations. In other words, the control system may be centrally located or distributed throughout the system. Indeed, the control system may be integrated into various networked components that collectively define the control system.

A control and monitoring system typically utilizes a network to facilitate communication between various industrial devices, such as sensors and actuators, and higher-level devices, such as programmable controllers and computers. A range of networks and corresponding protocols are known and are presently available to facilitate control and monitoring operations. For example, DeviceNet, which is based on controller area network (CAN) technology, is an open device level network developed by Rockwell Automation that uses common industrial protocol (CIP) to provide the capability to control, configure, and collect data for many available industrial devices.

Control system networks include certain physical components or features that facilitate proper operation and communication. For example, a control system network may include various conductors to facilitate transmission of power and data signals between components of the network. In other words, various devices of a control system may be communicatively coupled to one another via such conductors. A typical data system, such as for the DeviceNet protocol, includes a ground conductor, a power conductor, and a pair of data conductors. In some systems, each of these conductors may be provided as a single cable. For example, the various conductors may be provided within a single sheath that defines the outer portion of a cable, or the various conductors may be sheathed separately and bundled together as a single cable to efficiently provide each of their various functions throughout a system.

The power conductor in a control system network supplies various devices of the control system network with power from one ore more power supplies. A power supply may receive power originating from a power source, such as a power grid, at an initial power level and convert the power to an operable power level. For example, a particular power supply may receive power from a 110 VAC source, convert the 110 VAC to 24 VDC, and supply a plurality of devices with the 24 VDC to facilitate operation of each of the devices. However, a single power supply may be limited in its ability to provide sufficient power under certain circumstances. Indeed, due to voltage losses, a single power supply may not be able to provide power over long distances. For example, if several devices are substantially spaced apart on a power conductor, the power supply may not be able to efficiently power all of the devices because of voltage losses over the length of the power conductor. Similarly, a single power supply may not be capable of powering a large number of devices. Accordingly, it is often desirable to utilize multiple power supplies in a single network to provide sufficient power while maintaining communication between the networked devices.

While the inclusion of multiple power supplies may facilitate the operation of systems including numerous devices and/or systems including long cable lengths, inclusion of multiple power supplies may also be associated with various inefficiencies. For example, including extra power supplies in a network can be expensive. Further, multiple power supplies can cause accessibility issues when they are located a great distance from one another.

BRIEF DESCRIPTION

Embodiments of the present technique are directed to powering multiple segments of a control and monitoring system network with a single power supply. Specifically, present embodiments are directed to a single-input and dual-output power supply that consolidates the functionality of two separate power supplies. For example, a power supply in accordance with the present invention is capable of powering at least two distinct network segments, which may include various separate devices, while maintaining connectivity of communication signals and ground between the distinct network segments.

A single-input and dual-output power supply in accordance with present embodiments includes an integral coupling feature, such as a "T-connector" that enables communicative coupling with a power source and two distinct segments of a network cable. More particularly, the single-input and dual-output power supply, which may be referred to herein as a "consolidated power supply," includes a single power input that is shared by a pair of network power outputs. The single power input is configured for receiving power from a power source and at least partially converting the received power to an operable power. The pair of network power outputs includes two separate and common grounded power output drivers for providing power to separate network segments. Additionally, the consolidated power supply includes a connectivity feature for maintaining connectivity of communication signals and ground between the distinct network segments.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
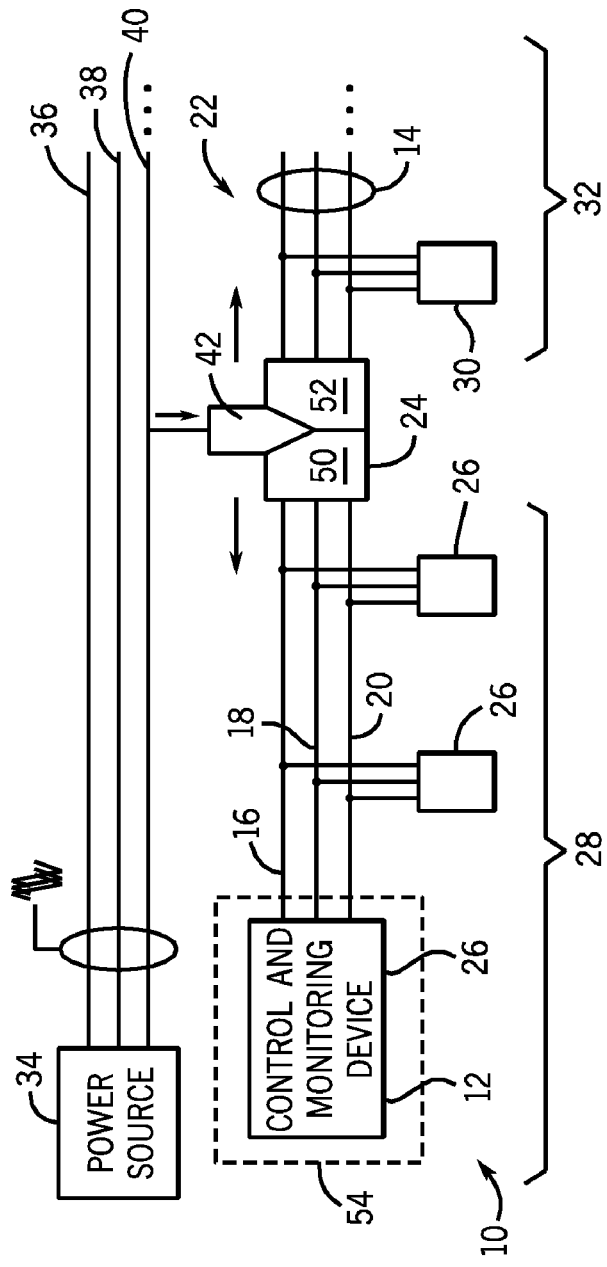
FIG. 1 is diagrammatical representation of a control and monitoring system incorporating a consolidated power supply in accordance with aspects of the present technique.

Turning now to the drawings, and referring first to FIG. 1, a control and monitoring system is illustrated and designated generally by reference numeral 10. The system 10 may be incorporated into any of a variety of industrial settings, which might include manufacturing processes, assembly lines, material handling and conveyers, chemical process controls, fluid handling systems, and so forth. The present techniques are not intended to be limited to any particular types of monitored or controlled processes.

As illustrated, the system 10 includes various components for supplying electrical power and signals to sensors, controllers, mechanical equipment, and the like that are communicatively coupled with and incorporated into the system 10. As will be appreciated by those skilled in the art, components operated or monitored by the system 10 may include any of a wide range of features that have powered loads and/or points at which certain sensed data is collected for control and monitoring purposes. For example, in the illustrated embodiment, the system 10 comprises a control and monitoring device 12 that communicates with various sensors, controllers, and equipment of the system 10. Communications between the control and monitoring device 12 and other system components may be transmitted via a cable 14 that includes a ground conductor 16, a pair of data conductors 18, and a power conductor 20. Thus, both data and power may be transmitted throughout the system 10 over a single network 22.

The control and monitoring device 12 may include, for example, a programmable controller, a computer, or the like. The control and monitoring device 12 may function as a receiving and processing center for any number of data signals. Additionally, the control and monitoring device 12 may generate response signals or control signals for various components of the system 10. In other words, the control and monitoring device 12 may operate as a nerve center for the system 10. However, it should be noted that while FIG. 1 illustrates the control and monitoring device 12 as a centralized feature, in other embodiments control and monitoring functionality may be distributed throughout the system 10. Indeed, various components of the system 10 may coordinate their individual functions to collectively provide control and monitoring functionality for the entire system 10.

In some embodiments, the control and monitoring device 12 may have a dedicated power supply that is integral with the control and monitoring device 12 and supplemental to other system power components. However, in the illustrated embodiment, the control and monitoring device 12 is powered by a consolidated power supply 24, which also powers other system components, such as sensors and controllers. Indeed, the consolidated power supply 24 provides power to a first set of components 26 in a first leg 28 of the network 22, and a second set of components 30 in a second leg 32 of the network 22. The sets of components 26 and 30 may include devices such as the control and monitoring device 12, a motor control that controls a pump, a sensor that cooperates with a sensing element, and the like.

Specifically, in operation, the primary power supply 24 converts power received at a first level from a power source 34, such as a power grid, to an operable power level suitable for use in powering components of the system, such as the control and monitoring device 12. For example, the power source 34 may provide three-phase power that is conducted over three separate source lines 36, 38, and 40. The consolidated power supply 24 may communicatively couple with one of the source lines 36, 38, or 40 to receive a single phase of 110 VAC. Further, the consolidated power supply 24 may convert the 110 VAC to an operable voltage, such as 24 VDC, to provide an appropriate level of power to system devices. Indeed, in the illustrated embodiment, the primary power supply 24 converts power from source line 40 to provide operable power to the first and second legs 28 and 32 of the network 22. Specifically, a single input component 42 of the consolidated power supply 24 receives power from source line 40. Then, the consolidated power supply 24 converts the power from a first level (e.g., 110 VAC) to an operable level (e.g., 24 VDC) for use in driving the sets of network components 26 and 30 of the two legs 28 and 32 of the network 22. The operable power is distributed by the consolidated power supply 24 to the network legs 28 and 32 with two common grounded power output drivers 50 and 52, respectively.

In the illustrated embodiment, the control and monitoring device 12 is located in a main electrical cabinet 54. Electrical cabinets, such as the main electrical cabinet 54, are protective containers for electronic equipment that are typically centrally located in the industrial setting of the system 10 to facilitate user access. Thus, the main electrical cabinet 54 serves as a central access point and protective enclosure for the monitoring device 12 and other electronic equipment. In traditional systems, a primary power supply is also typically located in the main electrical cabinet 54 to provide power to the monitoring device 12 and other system components. It should be noted that space is often limited in such cabinets.

In many systems, a single power supply is insufficient to provide adequate power to all system components. Thus, additional power supplies are typically utilized at locations away from the main electrical cabinet 54, which typically includes the primary power supply, to boost power. While a single power supply may be capable of providing operable power to a number of devices that are spaced over a certain distance, its abilities are limited. Indeed, due to voltage losses and excessive power demands, a single power supply may not be able to supply power to devices that are separated by long lengths of cable. Similarly, a single power supply may not be capable of supplying a large number of devices with an appropriate level of power. Accordingly, depending on the size and nature of a particular system, it may be necessary to provide additional power supplies to supplement power to various parts of a system. Because the different areas of a system requiring supplemental power are typically positioned a distance from one another, supplemental power supplies are not typically located in a central control cabinet, such as the main electrical cabinet 54, and have their own protective coverings.

Many control systems, such as those that utilize DeviceNet, may only require two power supplies to properly enable operation of all system components. For example, a traditional system may include a primary power supply that provides power to the components of a first segment of a network, and a secondary power supply that provides power to a second segment of the network that is downstream from the first segment. The secondary power supply may be coupled to the network via a drop cable and a coupling device, such as a "T-connector." The drop cable may couple with the power supply and the T-connector, and the T-connector may couple with drop cable and the network cable. The T-connector may break into the network cable, terminate power supplied from the network cable upstream of the T-connector, and facilitate the provision of power to components on the network cable downstream of the T-connector from the secondary power supply. If a system requires more than two power supplies, additional power supplies may be positioned downstream of the secondary power supply accordingly. This traditional technique for providing supplemental power requires numerous components that can be expensive and inconvenient to install.

Embodiments of the present invention eliminate the need for positioning a primary power supply in the main electrical cabinet 54. Indeed, by combining two power outputs into a single power supply that can be locally positioned, present embodiments may facilitate more efficient access to address issues relating to the power supply for multiple network segments and reduce costs. For example, many systems only require two traditional power supplies, which may be replaced by the single consolidated power supply 24. Thus, in the event that all of the devices on a two-segment network need to be reset, such as when a data error causes network components to enter a fault state, a user can readily reset power to all of the components by accessing the single consolidated power supply 24. This may be more efficient than traditional systems, which would require the user to reset two separate power supplies that would typically be located in positions distant from one another.

Additionally, present embodiments efficiently utilize power conversion components and other device components. For example, the consolidated power supply 24 includes integral coupling features that reduce inefficiencies associated with coupling traditional power supplies to a network. Indeed, as discussed above traditional power supplies include numerous separate components (e.g., a drop cable and a separate T-connector) for coupling with a network and taking over power supply functions. In contrast, present embodiments include integral coupling features that perform such functions. Further, in accordance with present embodiments, a single power supply, such as the consolidated power supply 24, may provide the power supply function of two traditional power supplies in a control and monitoring system, thus, saving expenses associated with providing separate power supplies. For example, as illustrated in FIG. 1, the consolidated power supply 24 provides power to the two separate legs 28 and 32 of the network 22 using the single input component 42.

Further, present embodiments do not require termination of power supplied from an upstream device because both legs 28 and 32 of the network 22 are downstream relative to the consolidated power supply 24. In contrast, if power to the network 22 were provided by a traditional system, a primary power supply would be required to power the first leg 28, and a secondary power supply located downstream from the primary power supply would be required to terminate the supply of power from the primary power supply and take over power supply functions for the second leg 32, which would be downstream from the first leg 28 in a traditional system.

Figure 2:
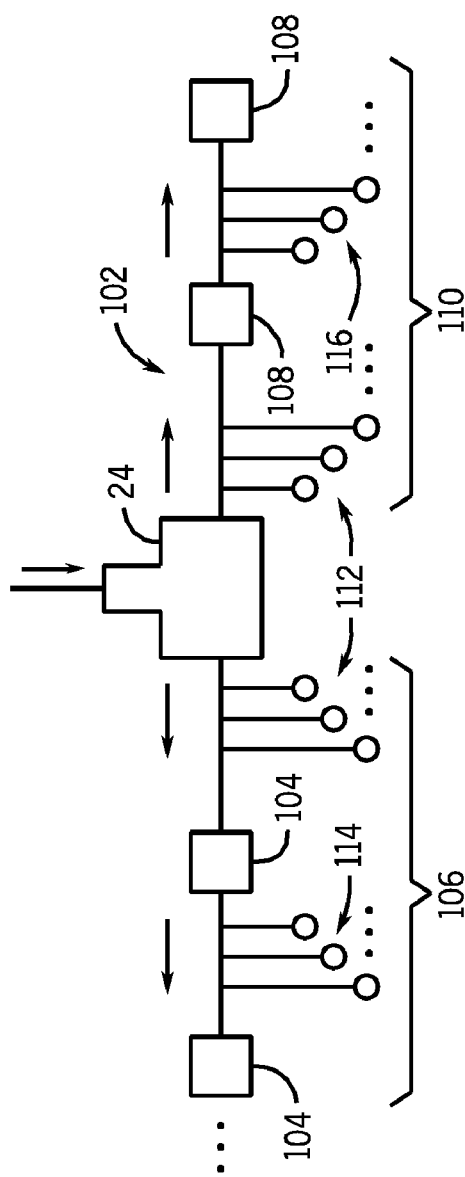
FIG. 2 is diagrammatical representation of a consolidated power supply on a network and a plurality of supplemental power supplies communicatively coupled along the network downstream from the consolidated power supply in accordance with aspects of the present technique.

While the embodiment illustrated in FIG. 1 illustrates the consolidated power supply 24 as the only power supply on the system 10, other embodiments may include additional power supplies. Indeed, while the consolidated power supply 24 may be utilized to provide power to network components that would traditionally be supplied by two power supplies, additional power supplies may still be needed downstream from the consolidated power supply 24 due to the length of network cable or number of device components in the system. Present embodiments, may address this issue by incorporating supplemental power supplies downstream from the consolidated power supply 24. For example, FIG. 2 illustrates the consolidated power supply 24 disposed along a network 102 with a first set of downstream supplemental power supplies 104 on a first leg 106 of the network 102, and a second set of downstream supplemental power supplies 108 on a second leg 110 of the network 102. The consolidated power supply 24 supplies power to devices 112, which are immediately downstream from the consolidated power supply 24 on both legs 106 and 110 of the network 102. The individual power supplies in each of the first and second sets of supplemental power supplies 104 and 108 terminate upstream power and take over supplying power to downstream network devices 114 and 116, respectively. Specifically, for example, each of the first set of supplemental power supplies 104 provides power to the devices 114 immediately downstream and terminates power provided from any upstream power supply.

Figure 3:
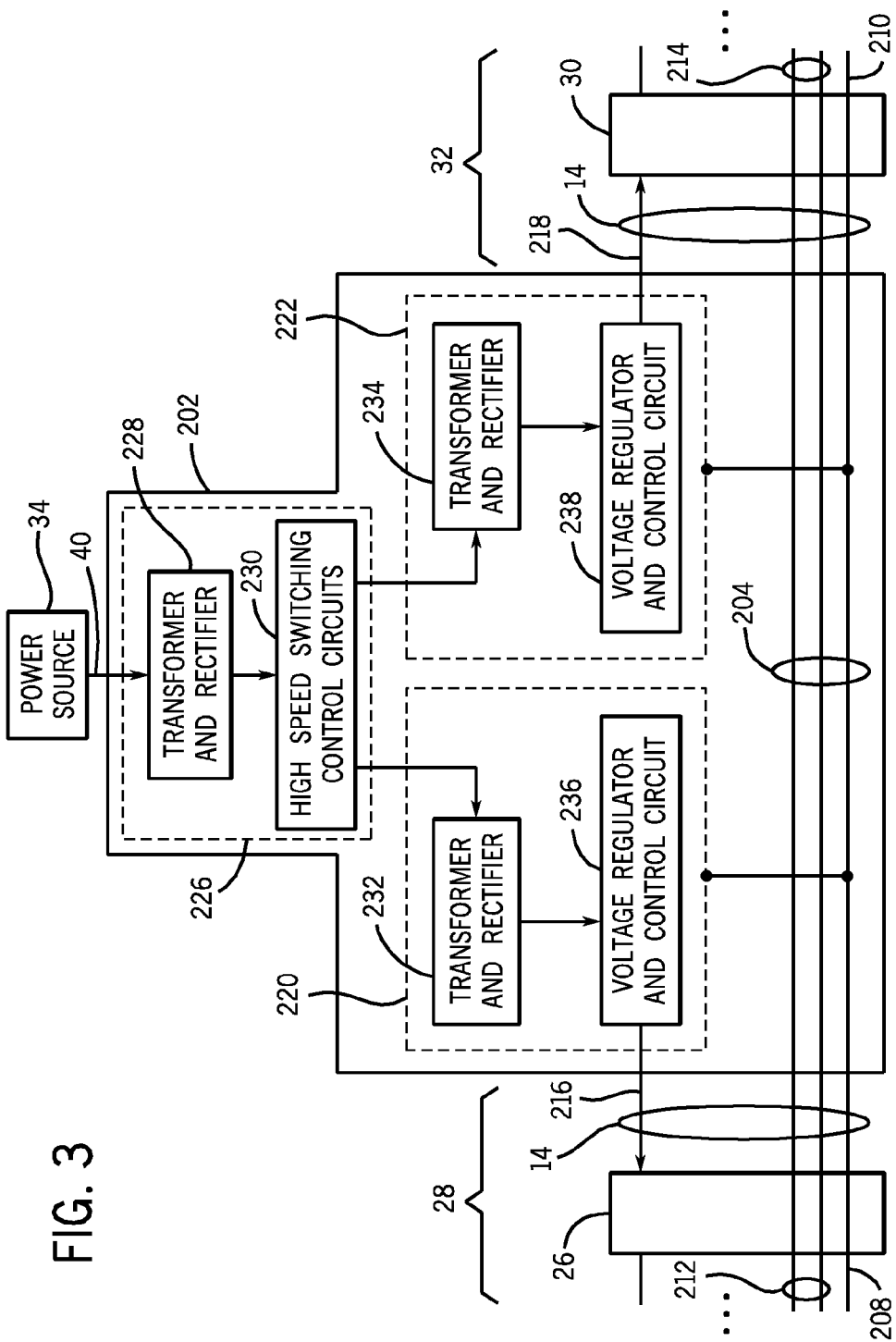
FIG. 3 is a schematic representation of a consolidated power supply coupled to a power source and a network cable in accordance with aspects of the present technique.

FIG. 3 is a schematic representation of the consolidated power supply 24 coupled to the power source 34 via the power line 40, and coupled to the network components 26 and 30 via the network cable 14. The consolidated power supply 24 may include various components disposed in a single housing 202, wherein the components coordinate with each other and the separate legs 28 and 32 of the network cable 14. Indeed, the consolidated power supply 24 includes features that facilitate communicative coupling between the separate legs 28 and 32 of the network cable 14. For example, in the illustrated embodiment, conductive elements 204 of the consolidated power supply 24 function to maintain connectivity of communication signals and ground between the first leg 28 and the second leg 32 of the network cable 14 by communicatively coupling a first ground conductor 208 of the firs leg 28 to a second ground conductor 210 of the second leg 32, and communicatively coupling a first data conductor pair 212 of the first leg 28 to a second data conductor pair 214 of the second leg 32. It should be noted that coupling of the conductors of the network cable 14 to features of the consolidated power supply 24, such as the conductive elements 204, may be achieved via terminals or the like disposed within the single housing 202.

As illustrated in FIG. 3, the consolidated power supply 24 includes two separate and common grounded power output drivers 220 and 222 that operate to provide power to the network components 26 and 30 via power conductors 216 and 218 in each of the first and second legs 28 and 32 of the network cable 14. The power output drivers 220 and 222 are separate, Class 2, Open DeviceNet Vendors Association (ODVA) approved, power supply outputs with integral network cable coupling features. The power output drivers 220 and 222 are configured to receive power from a shared power input 226 of the consolidated power supply 24. By sharing the power input 226, present embodiments more efficiently utilize certain device components in the consolidated power supply 24, while providing the functionality of two separate traditional power supplies via the power output drivers 220 and 222.

In operation, the consolidated power supply 24 receives power from the power source 34 through the source line 40, which couples to the power input 226. In the illustrated embodiment, the power input 226 includes a transformer and rectifier pair 228, and high speed switching and control circuits 230. The transformer and rectifier pair 228, which includes a transformer and a rectifier, receives AC from the power source 34 and converts the AC to unregulated DC. The unregulated DC is then passed through the high speed switching control circuits 230, which function as an AC chopping circuit. In other words, the high speed switching control circuits 230 convert the unregulated DC to a higher frequency AC. The conversion of the unregulated DC to the higher frequency AC by the high speed switching and control circuits 230 facilitates efficient conversion of high voltage AC (e.g., 110 VAC) to an operable voltage (e.g., 24 VDC) for powering network components.

The high speed switching and control circuits 230 may provide the high frequency AC to separate transformer and rectifier pairs 232 and 234 in each of the power output drivers 220 and 222, respectively. Each of these transformer and rectifier pairs 232 and 234, which each include a transformer and a rectifier, receives the high frequency AC and converts the AC to DC. Further, each of the power output drivers 220 and 222 respectively includes a voltage regulator and control circuit 236 and 238. Each voltage regulator and control circuit is configured to regulate the DC received from the respective transformer and rectifier pairs 232 and 234 for supply to devices located downstream from the consolidated power supply 24 on both legs 28 and 32 of the network 22. Thus, the consolidated power supply 24 is capable of supplying two distinct device sets (e.g., devices 26 and 30) with power via the separate and common grounded output drivers 220 and 222, which share the common power input 226. Additionally, the illustrated features of the consolidated power supply 24 enable the consolidated power supply 24 to directly couple with the network cable 14 without the use of separate coupling features, such as a separate T-connector and drop cable, and to maintain connectivity of communication signals and ground between the first leg 28 and the second leg 32 of the network cable 14.

Figure 4:
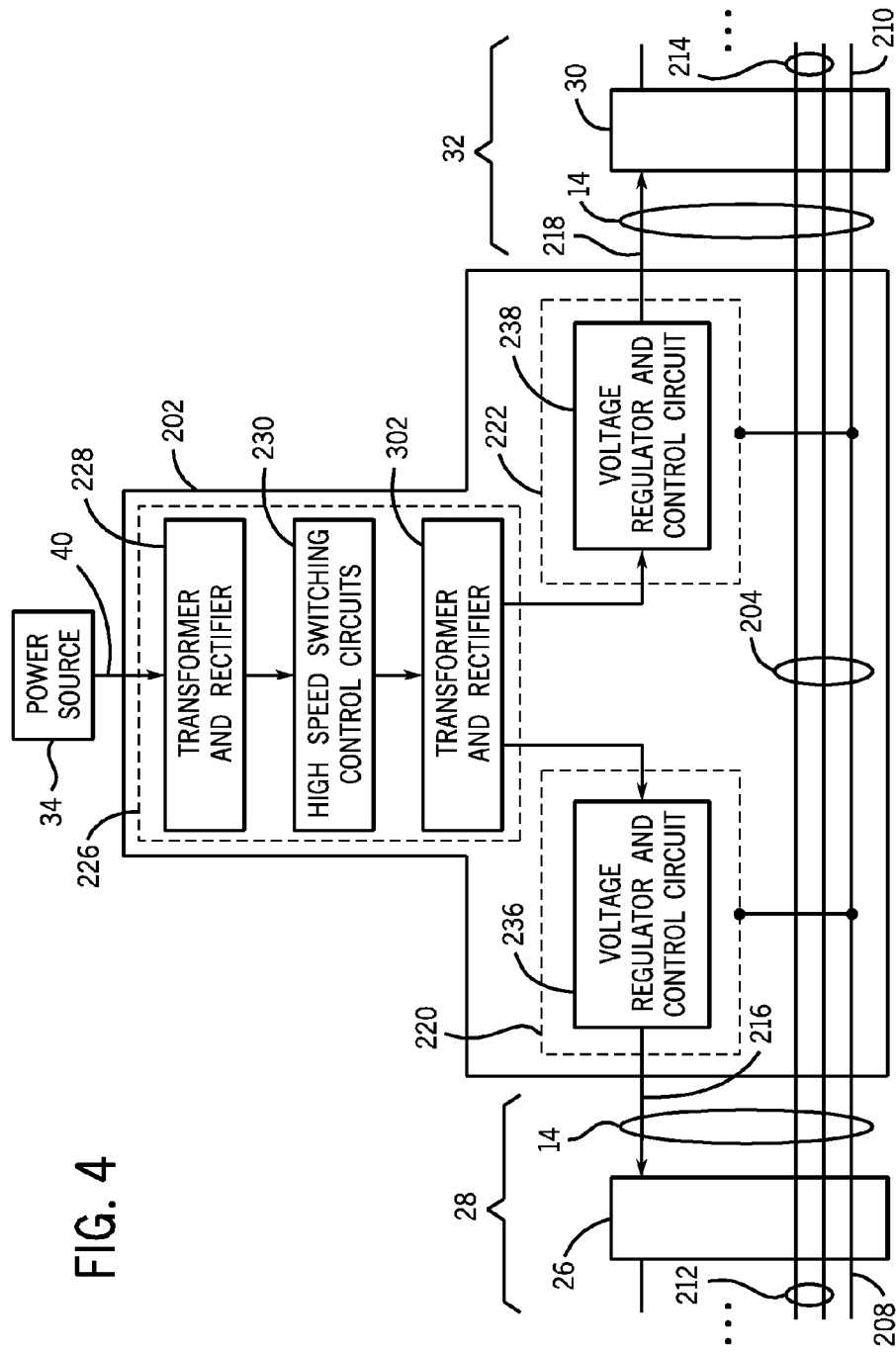
FIG. 4 is a schematic representation of a consolidated power supply coupled to a power source and a network cable in accordance with aspects of the present technique.

In some embodiments, certain components of the separate output drivers 220 and 222 may be combined into the shared power input 226 of the consolidated power supply 24. For example, as illustrated in FIG. 4, rather than including the transformer and rectifier pair 232 in the first power output driver 220, and the transformer and rectifier pair 234 in the second power output driver 222, both transformer and rectifier pairs 232 and 234 may be essentially combined into a single transformer and rectifier pair 302 within the shared power input 226. This may further simplify the construction and maintenance associated with the consolidated power supply 24.

Figure 5:
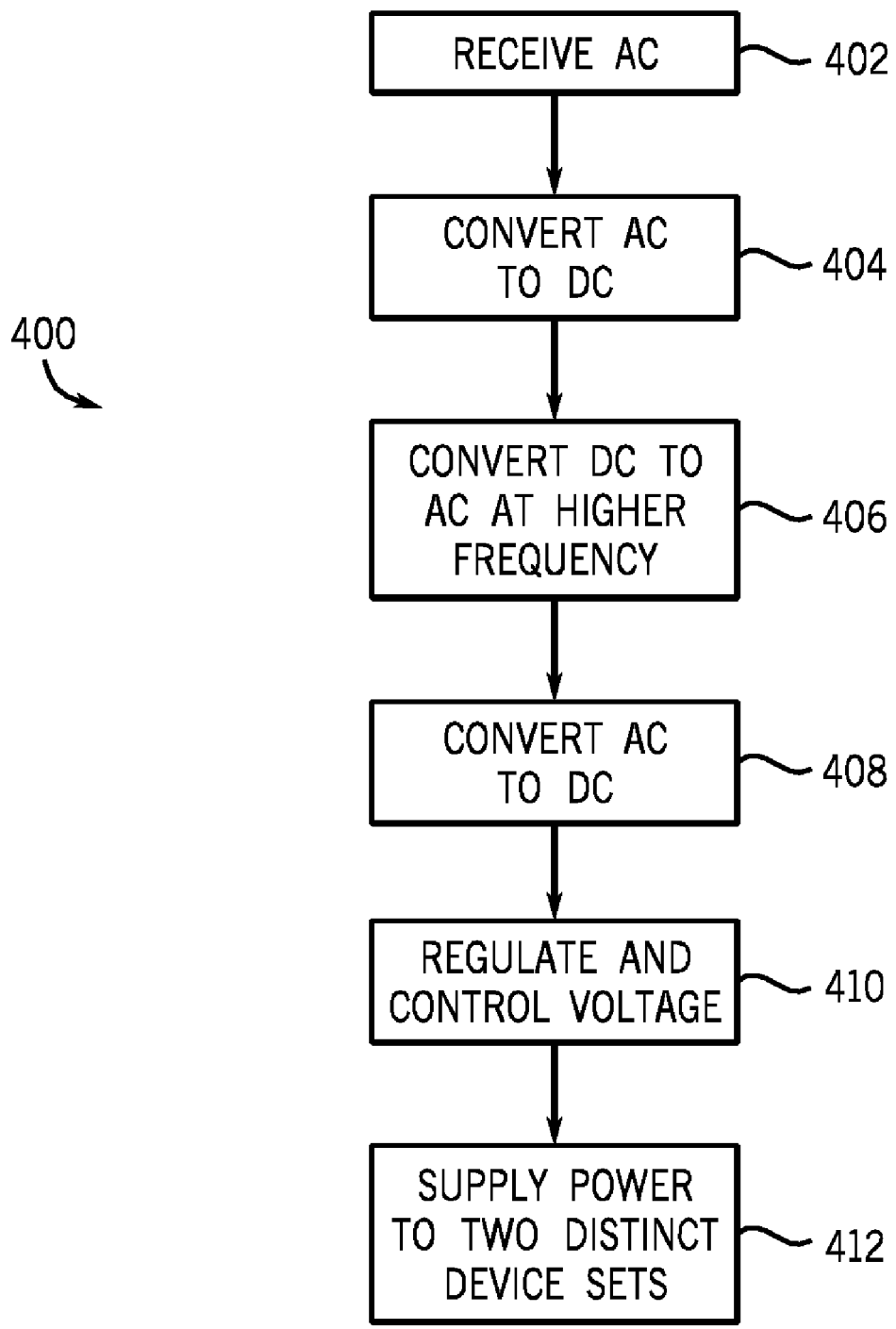
FIG. 5 is a process flow diagram representing a method in accordance with aspects of the present technique.

FIG. 5 is a process flow diagram representing a method in accordance with aspects of the present technique. The method is generally indicated by reference numeral 400. The method 400 begins with receiving high voltage AC power from a power source into a single power supply unit, as represented by block 402. For example, block 402 may represent the consolidated power supply 24 receiving high voltage AC into the power input 226 from the power source 34. After the high voltage AC has been received, it is converted to unregulated DC, as illustrated by block 404. Specifically, block 404 may represent transforming and rectifying the AC by passing it through a transformer and rectifier, such as the transformer and rectifier pair 228. The unregulated DC is then converted to AC at a higher frequency to facilitate efficient overall conversion of the high voltage AC (e.g., 110 VAC) to an operable power level (e.g., 24 VDC) for network components, as represented by block 406. Specifically, block 406 may represent passing the unregulated DC through the high speed switching and control circuits 230 of the power input 226. The high frequency AC may then be converted to DC, as illustrated by block 408. The actions of block 408 may be performed by one or more transformer and rectifier pairs, such as those described with respect to FIGS. 3 and 4. For example, the actions of block 408 may be performed by the single transformer and rectifier pair 302 in the power input 226, or by the separate transformer and rectifier pairs 232 and 234 included in each of the power output drivers 220 and 222. The DC is then regulated at an appropriate level, as indicated by block 410. For example, the DC may be controlled at a level around 24 VDC to facilitate provision of an appropriate level of power to network devices by the voltage regulator and control circuits 236 and 238. Finally, the method supplies power to two distinct device sets on a network, as illustrated by block 412.

While only certain features of the invention have been illustrated and described herein, many modifications and changes will occur to those skilled in the art. It is, therefore, to be understood that the appended claims are intended to cover all such modifications and changes as fall within the true spirit of the invention. The concurrently filed application Ser. No. 12/236,411 entitled "On-Machine Power Supply with Integral Coupling Features" by James Furukawa, Nicholas R. Goebel, and Amy L. Stachowiak, is hereby incorporated by reference in its entirety. Also, the concurrently filed application Ser. No. 12/236,364 entitled "System and Method for Employing an On-Machine Power Supply with Monitoring and Control Capability" by James Furukawa, Nicholas R. Goebel, Robert D. Law, and Amy L. Stachowiak, is hereby incorporated by reference in its entirety.

The invention claimed is:

1. A control and monitoring system power supply, comprising:
   a single power input configured to receive power into the power supply from a power source;
   a first power output driver configured to receive power from the single power input, regulate the power, and distribute the power from the power supply to a first power conductor of a first network cable segment, wherein the first power output driver comprises a first transformer and rectifier pair configured to convert AC to DC, a first voltage regulator, and a first control circuit configured to regulate the DC from the first transformer and rectifier pair;
   a second power output driver configured to receive power from the single power input, regulate the power, and distribute the power from the power supply to a second power conductor of a second network cable segment, wherein first and second power output drivers are separate within the power supply and common grounded, wherein the second power output driver comprises a second transformer and rectifier pair configured to convert AC to DC, a second voltage regulator, and a second control circuit configured to regulate the DC from the second transformer and rectifier pair; and
   an integral coupling feature configured to respectively couple the first and second power output drivers to the first and second power conductors, while maintaining connectivity of communications between a pair of parallel data conductors in the first and second network cable segments.

2. The control and monitoring system power supply of claim 1, wherein the single power input is configured to receive AC from a power source and at least partially convert the AC to an operable voltage for a network device.

3. The control and monitoring system power supply of claim 2, wherein the single power input is configured to convert 110 VAC to 24 VDC.

4. The control and monitoring system power supply of claim 1, wherein the integral coupling feature is configured to maintain connectivity of ground conductors in the first and second network cable segments.

5. The control and monitoring system power supply of claim 1, comprising a reset feature that facilitates cycling power to network devices receiving power from the first and second power output drivers.

6. The control and monitoring system power supply of claim 1, wherein the first and second power output drivers each comprise an Open DeviceNet Association approved power supply output.

7. The control and monitoring system power supply of claim 1, wherein the first and second power output drivers each comprise integral network coupling features.

8. The control and monitoring system power supply of claim 1, wherein the single power input comprises a transformer and rectifier pair.

9. The control and monitoring system power supply of claim 1, wherein the single power input comprises high speed switching and control circuits configured to function as an AC chopping circuit.

10. The control and monitoring system power supply of claim 1, comprising a first plurality of network devices communicatively coupled to the first network cable segment and a second plurality of network devices communicatively coupled to the second network cable segment.

11. A consolidated dual power supply, comprising:
a power input configured to receive power into the power supply from a source line;
a first power output driver configured to receive power from the power input and distribute the power from the power supply to a first network leg, wherein the first power output driver comprises a first transformer and rectifier pair configured to convert AC to DC, a first voltage regulator, and a first control circuit configured to regulate the DC from the first transformer and rectifier pair;
a second power output driver configured to receive power from the power input and distribute the power from the power supply to a second network leg, wherein the second power output driver comprises a second transformer and rectifier pair configured to convert AC to DC, a second voltage regulator, and a second control circuit configured to regulate the DC from the second transformer and rectifier pair; and
a coupling feature configured to maintain connectivity of communications between a pair of parallel data conductors of the first and second network legs, and configured to maintain connectivity of ground between ground conductors of the first and second network legs.

12. The consolidated dual power supply of claim 11, wherein the power input comprises a transformer and rectifier pair configured to convert AC to DC.

13. The consolidated dual power supply of claim 11, wherein the power input comprises high speed switching and control circuits configured to function as an AC chopping circuit.

14. The consolidated dual power supply of claim 11, comprising a transformer and rectifier pair configured to receive AC from the power input and supply DC to each of the first and second power output drivers.

15. A method, comprising:
receiving high voltage AC from a power source into a power supply input;
converting the high voltage AC from the power supply input to unregulated DC;
converting the unregulated DC to AC at a high frequency;
converting the AC at the high frequency to DC;
regulating the DC to an appropriate level for powering network devices; and
supplying the regulated DC to two distinct device sets on at least two separate legs of a network, wherein converting the high voltage AC to unregulated DC comprises passing the high voltage AC through a transformer and rectifier.

16. The method of claim 15, wherein converting the high frequency AC to the DC comprises passing the high frequency AC through one or more transformer and rectifier pairs.

17. The method of claim 15, wherein regulating the DC to the appropriate level comprises regulating the DC to substantially 24 VDC.

18. The method of claim 15, comprising maintaining connectivity of communications and ground between the separate legs of the network.

19. A consolidated dual power supply, comprising:
a power input configured to receive power from a source line;
a first power output driver configured to receive power from the power input and distribute the power to a first network leg;
a second power output driver configured to receive power from the power input and distribute the power to a second network leg;
wherein the first power output driver comprises a first transformer and rectifier pair and the second power output driver comprises a second transformer and rectifier pair, wherein each of the first and second rectifier pairs is configured to convert AC to DC;
wherein the first power output driver comprises a first voltage regulator and a first control circuit configured to regulate the DC from the first transformer and rectifier pair, and the second power output driver comprises a second voltage regulator and a second control circuit configured to regulate the DC from the second transformer and rectifier pair; and
a coupling feature configured to maintain connectivity of communications and ground between the first and second network legs.

* * * * *